(12) United States Patent
Zhou

(10) Patent No.: US 11,174,094 B2
(45) Date of Patent: Nov. 16, 2021

(54) BIOLOGICAL SHEET STORAGE DEVICE

(71) Applicant: BOE TECHNOLOGY GROUP CO., LTD., Beijing (CN)

(72) Inventor: Shi Zhou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 265 days.

(21) Appl. No.: 16/489,585

(22) PCT Filed: Oct. 10, 2018

(86) PCT No.: PCT/CN2018/109588
§ 371 (c)(1),
(2) Date: Aug. 28, 2019

(87) PCT Pub. No.: WO2019/157827
PCT Pub. Date: Aug. 22, 2019

(65) Prior Publication Data
US 2020/0010264 A1    Jan. 9, 2020

(30) Foreign Application Priority Data

Feb. 13, 2018 (CN) .......................... 201810150491.6

(51) Int. Cl.
| | | |
|---|---|---|
| *B65D 85/20* | (2006.01) | |
| *B65D 25/10* | (2006.01) | |
| *B65D 81/22* | (2006.01) | |
| *A01N 1/02* | (2006.01) | |
| *G01N 1/00* | (2006.01) | |
| *B01L 9/00* | (2006.01) | |

(52) U.S. Cl.
CPC .......... *B65D 85/20* (2013.01); *A01N 1/0263* (2013.01); *B65D 25/101* (2013.01); *B65D 81/22* (2013.01); *B01L 9/00* (2013.01); *G01N 2001/002* (2013.01)

(58) Field of Classification Search
CPC ...... B65D 85/20; B65D 81/22; B65D 25/101; A01N 1/0263; B01L 9/00; G01N 2001/002
See application file for complete search history.

(56) References Cited

U.S. PATENT DOCUMENTS

| | | |
|---|---|---|
| 3,556,633 A | 1/1971 | Mutschmann et al. |
| 2002/0177119 A1 | 11/2002 | Wisniewski |
| 2004/0091395 A1 | 5/2004 | Ward et al. |

(Continued)

FOREIGN PATENT DOCUMENTS

| | | |
|---|---|---|
| CN | 1145409 A | 3/1997 |
| CN | 1582111 A | 2/2005 |

(Continued)

OTHER PUBLICATIONS

First Office Action and English language translation, CN Application No. 201810150491.6, dated Feb. 2, 2019, 15 pp.

*Primary Examiner* — Jennifer Wecker
*Assistant Examiner* — Kathryn Elizabeth Limbaugh
(74) *Attorney, Agent, or Firm* — Myers Bigel, P.A.

(57) ABSTRACT

An embodiment of the present disclosure provides a biological sheet storage device, which includes a holding unit including a first carrier, a second carrier and a fixture. The first carrier is configured to carry a biological sheet, the first carrier is positioned on the second carrier, and the fixture is configured to fix the first carrier onto the second carrier. An enclosure configured to enclose the holding unit that is configured to carry the biological sheet.

14 Claims, 4 Drawing Sheets

(56) References Cited

U.S. PATENT DOCUMENTS

2009/0155838 A1   6/2009  Hale
2015/0044765 A1   2/2015  Inoue

FOREIGN PATENT DOCUMENTS

| CN | 2831170 Y | 10/2006 |
|---|---|---|
| CN | 201158654 Y | 12/2008 |
| CN | 201163310 Y | 12/2008 |
| CN | 101896276 A | 11/2010 |
| CN | 102707420 A | 10/2012 |
| CN | 103091826 A | 5/2013 |
| CN | 203229010 U | 10/2013 |
| CN | 204110564 U | 1/2015 |
| CN | 104396942 A | 3/2015 |
| CN | 204548789 U | 8/2015 |
| CN | 108328082 A | 7/2018 |
| CN | 108357763 A | 8/2018 |
| JP | WO2013/051521 A1 | 4/2013 |
| JP | 2016-40078 A | 3/2016 |

BIOLOGICAL SHEET STORAGE DEVICE

CROSS REFERENCE TO RELATED APPLICATIONS

This application is a 35 U.S.C. 371 national stage application of a PCT International Application No. PCT/CN2018/109588, filed on Oct. 10, 2018, which claims the priority of a Chinese patent application No. 201810150491.6 filed on Feb. 13, 2018, the entire content of which is incorporated herein by reference.

FIELD

The present disclosure relates to a storage device, in particular to a biological sheet storage device for storing biological sheets.

BACKGROUND

Biological sheets are research hotspots in the field of biological tissue engineering in recent years, which have been widely used in the treatment of skin, cornea, heart, periodontal and other related diseases.

SUMMARY

An embodiment of the present disclosure provides a biological sheet storage device comprising:

a holding unit including a first carrier, a second carrier, and a fixture, wherein the first carrier is configured to carry a biological sheet, the first carrier is located on the second carrier, and the fixture is configured to fix the first carrier onto the second carrier; and an enclosure configured to enclose the holding unit carrying the biological sheet.

Optionally, the fixture comprises at least one pressing plate. The first carrier comprises a body for carrying the biological sheet and an extension extending from the body. The extension extends beyond the body, and the pressing plate is configured to movably press against at least a portion of the extension of the first carrier.

Optionally, the fixture comprises a plurality of pressing plates, and a first end of each of the pressing plates is connected to a first connector.

Optionally, the fixture comprises two parallel rectangular pressing plates, and a first end of each of the pressing plates extends beyond the second carrier and is connected to a first connector.

Optionally, a second end of each of the pressing plates is connected to a second connector.

Optionally, the pressing plate, the first connector and the second connector are connected to form an enclosed region, and the biological sheet is located inside the orthographic projection area of the enclosed region in a state that the first carrier carries the biological sheet.

Optionally, the first carrier comprises a water and air permeable cover film configured to at least partially cover the biological sheet in a state where the first carrier carries the biological sheet.

Optionally, the first connector is connected to the second carrier by a rotating mechanism configured to enable the fixture to disengage from the second carrier or engage with the second carrier.

Optionally, the first carrier comprises at least one projection connected to the extension.

Optionally, the first carrier is a carrier film made of a material having tissue compatibility with the carried biological sheet.

Optionally, the biological sheet comprises a cell sheet.

Optionally, the enclosure comprises a first diaphragm and a second diaphragm, wherein the first diaphragm and the second diaphragm are oppositely disposed, and the corresponding side edges of the first diaphragm and the second diaphragm are connected through a heat conductive material so that the first diaphragm and the second diaphragm form a bag with an end thereof open.

Optionally, the open end of the bag is provided with a sealing structure for sealing the bag.

Optionally, protective liquid is contained in the enclosure, and the holding unit is immersed in the protective liquid.

Optionally, the protective liquid comprises at least dimethyl sulfoxide.

DETAILED DESCRIPTION

Figure 1:
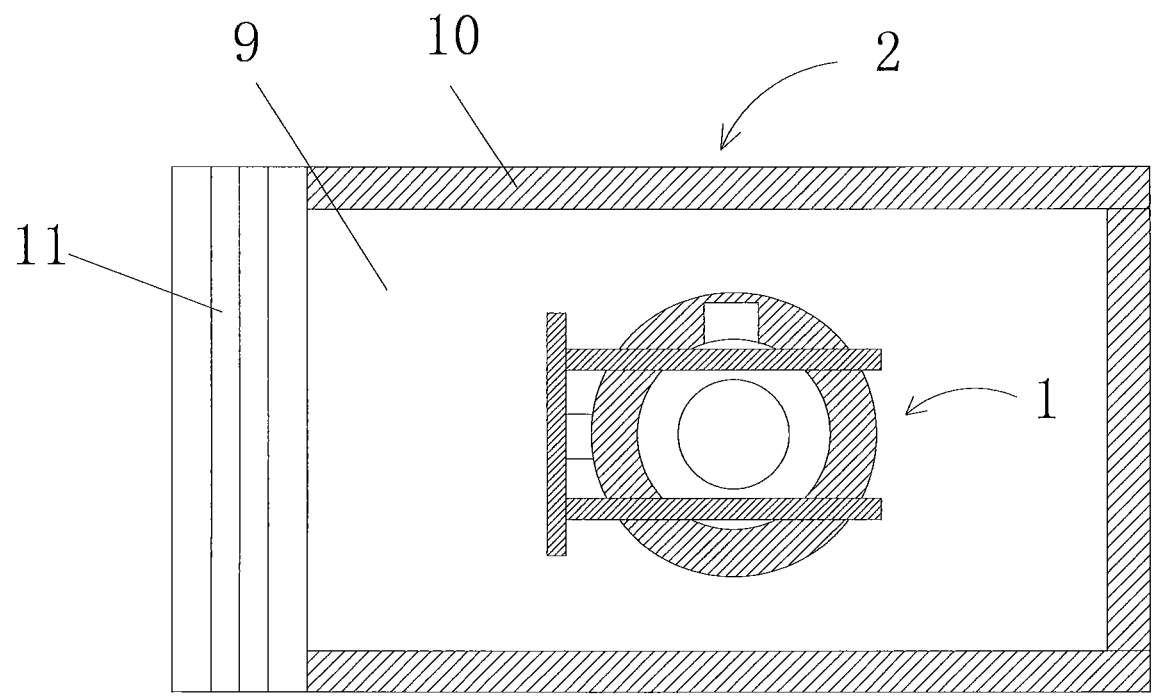
FIG. 1 is a schematic plan view of a biological sheet storage device in an embodiment of the disclosure.

Embodiments of the present disclosure are described in detail below with reference to the accompanying drawings.

The use of "first," "second," and similar words in this disclosure do not denote any order, quantity, or importance, but rather are used to distinguish different parts. Similar words such as "include" or "comprise" mean that the element before the word covers the elements listed after the word, and do not exclude the possibility of also covering other elements. "Up", "Down", "Left", "Right" and the like are only used to indicate the relative positional relationship. When the absolute position of the described object changes, the relative positional relationship may also change accordingly.

In the present disclosure, when it is described that a specific element is located between the first element and the second element, an intervening element may or may not exist between the specific element and the first element or the second element. When it is described that a specific element is connected to another element, the specific element may be directly connected to another element without any intervening element, or may be indirectly connected to another element with an intervening element therebetween.

All terms (including technical terms or scientific terms) used in this disclosure have the same meaning as those understood by those of ordinary skill in the art to which this disclosure belongs, unless otherwise specifically defined. It should also be understood that terms defined in, for example, a general dictionary should be interpreted as having a meaning most consistent with that they have in the context of the related art, and should not be interpreted in an idealized or extremely formalized meaning unless explicitly defined herein.

Technologies, methods and devices known to those of ordinary skill in the art may not be discussed in detail, but where appropriate, the technologies, methods and devices should be considered as part of the specification.

The preparation process of a biological sheet is generally complicated, the preparation period is long, and the storage and transportation are difficult, which brings difficulties to the clinical application of the biological sheet technology. In the related art, there is no storage device designed to be used for a biological sheet.

A cell storage device in related art usually stores cultured living cells. In order to facilitate cell cryopreservation or recovery, an inner surface of the storage device is often provided with a transparent sheet-like structure with an arc surface and having a super-hydrophobic surface functional area and a hydrophilic surface functional area as a carrier. This kind of device can be used for immobilization and storage of living cells, but is not suitable for storage and transportation of biological sheets.

In the embodiments of the present disclosure, the biological sheets include, but not limited to, cell sheets (cell membranes), physiological slices, skin samples, etc. For example, the biological sheet may be a cell sheet having a three-dimensional structure.

Figure 2:
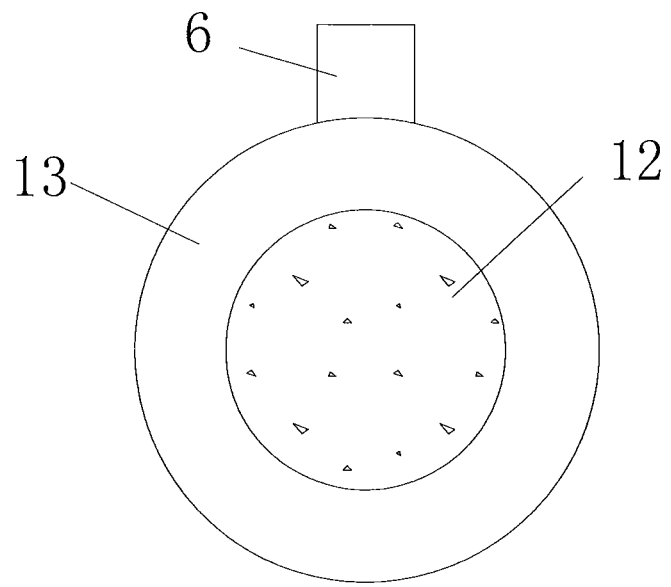
FIG. 2 is a schematic plan view of a biological sheet combined with a first carrier in an embodiment of the disclosure.

As shown in FIGS. 1 and 2, at least one embodiment of the present disclosure provides a biological sheet storage device including:

a holding unit 1, which includes a first carrier 13, a second carrier 3 and a fixture 4, wherein the first carrier 13 is configured to carry a biological sheet 12 and is disposed on a second carrier 3, and the fixture 4 is configured to fix the first carrier 13 onto the second carrier 3; and an enclosure 2 which is configured to enclose the holding unit 1 carrying the biological sheet 12.

According to the biological sheet storage device of the embodiment of the present disclosure, the holding unit is used for fixing the biological sheet 12, which not only prevents the biological sheet 12 from being damaged due to mutual collision with the second carrier 3 in the transportation process because of direct contact with the second carrier 3, but also effectively prevents the fixture 4 from directly contacting with the biological sheet 12 to press against the biological sheet 12, thereby more completely protecting the biological sheet 12 and prolonging the service life of the biological sheet 12. The biological sheet 12 is firstly fixed in the holding unit 1 and then enclosed by the enclosure 2, so that all-round protection of the biological sheet 12 is realized. The biological sheet 12 can be supported to undergo long-term low-temperature storage and long-distance transportation, the biological sheet 12 can be guaranteed not to be worn, torn or wrinkled during storage and transportation, and the three-dimensional structure of the biological sheet 12 and the performance of biological activity of the biological sheet 12 may not be affected.

In some embodiments of the present disclosure, as shown in FIG. 2, the first carrier 13 is of a shape matching the outline of the biological sheet 12. In this embodiment, the biological sheet 12 is circular as an example, so the shape of the first carrier 13 is correspondingly circular (of course, other shapes such as rectangular, etc. can also be used). The outer contour dimension of the first carrier 13 is larger than the outer contour dimension of the biological sheet 12. For example, the outer periphery of the first carrier 13 extends beyond the outer periphery of the biological sheet 12 to stably carry, attach or fix the biological sheet 12.

In some embodiments of the present disclosure, the preparation material of the first carrier 13 is not unique, and it can be e.g., a rigid material with smooth surface, or a flexible material with certain toughness, etc.

For example, the biological sheet 12 includes a cell sheet, and the first carrier 13 includes a carrier film made of a material having tissue compatibility with the biological sheet 12. Using the carrier film to carry the biological sheet 12 enables the biological sheet 12 to be tightly attached to the carrier film without any external force. In addition, since the carrier film is soft in texture and smooth in surface, the carrier film is not only easy for the biological sheet 1 to be laid thereon in a flat and wrinkle-free form, but also acts as a protective pad and buffer pad for the biological sheet 12 on the second carrier 3.

Optionally, the material having tissue compatibility with the biological sheet includes at least one of polyethylene, polypropylene, polyethylene glycol, polystyrene, nylon, polyacetal, polycarbonate, polyvinyl alcohol, polyethyleneimine, polysulfone, polylactic acid, polymethacrylate, polyurethane, glass, ceramic, and dextran.

In some embodiments of the present disclosure, in order to facilitate the user to move the carrier film, the carrier film in this embodiment is also provided with a projection 6 for the user to grasp. The projection 6 can be made of a material that does not affect the characteristics of the carrier film and does not introduce impurities into the carrier film but has certain mechanical toughness (e.g., hard plastic), or can also be made of a material that can be used for preparing the carrier film, and can also be made of the same material as the carrier film.

In some embodiments of the present disclosure, the holding unit 1 may be configured as one or more clamping mechanisms, and at least two jaws of the clamping mechanism are configured to press against the first carrier 13 and the second carrier 3, respectively, for example, against an edge region of the first carrier 13, an edge region of the second carrier 3, or other selected positions (e.g., selected positions corresponding to an outer peripheral region of the first carrier), thereby fixing the first carrier 13 and the second carrier 3 together.

Figure 3:
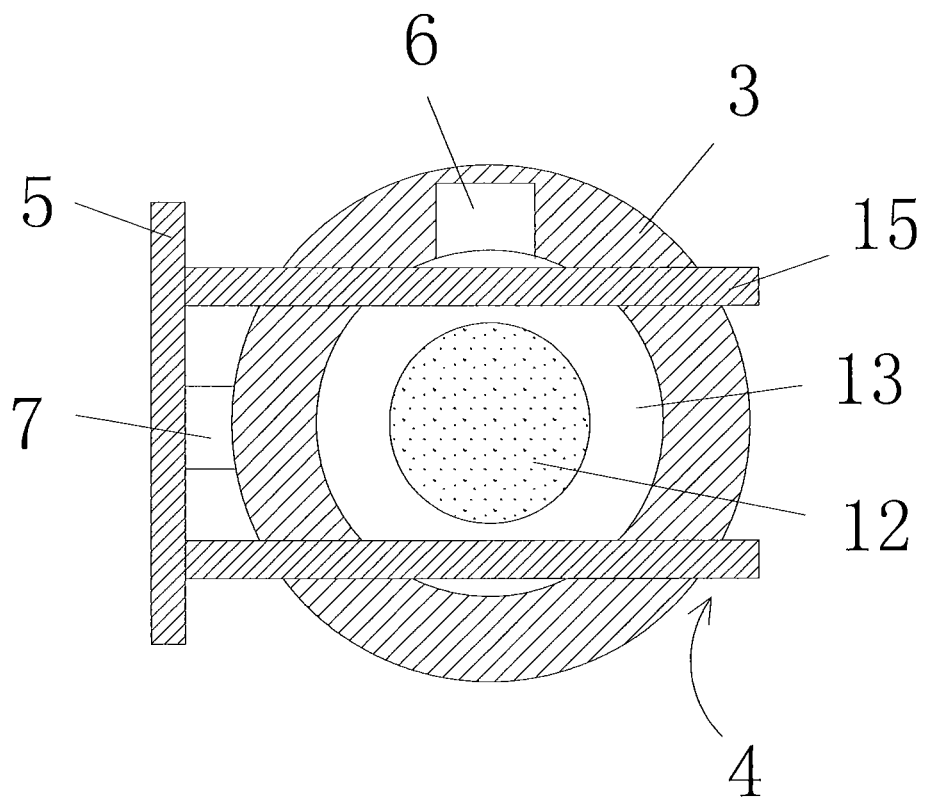
FIG. 3 is a schematic plan view of a holding unit in an embodiment of the disclosure.
Figure 4:
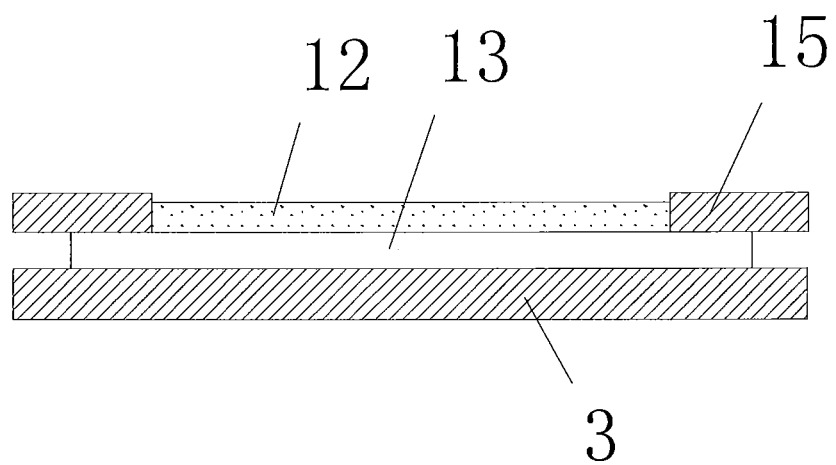
FIG. 4 schematically shows a side sectional view of a holding unit in an embodiment of the present disclosure.

In some embodiments of the present disclosure, as shown in FIGS. 3 and 4, the holding unit 1 may be suitable for the case where a portion of the first carrier 13 extending beyond the biological sheet 12 is narrow. For the case where a portion of the first carrier extending beyond the biological sheet 12 is wider, the fixture 4 may be made into a plate shape having a larger width to cover a larger-area of the first carrier. As for the case where both the biological sheet 12 and the first carrier 13 are large, or the biological sheet 12 is small and the first carrier 13 is large so that a portion of the first carrier 13 extending beyond the biological sheet 12 is large, a plurality of fixtures 4 may be provided, for example, a set of fixtures 4 may be provided at positions located at both sides of the biological sheet 12, respectively, and the number of fixtures 4 may be determined according to the shape of the fixtures 4. If the fixtures 4 are rod-shaped or narrow strip-shaped plates, more (for example, not less than 5) fixtures 4 may be provided. If the fixtures 4 are plate-shaped with larger width, fewer (for example, 2-5) fixtures 4 may be provided.

In some embodiments of the present disclosure, the fixture 4 includes at least one pressing plate 15, the first carrier 13 includes a body for carrying the biological sheet 12 and an extension extending from the body. The extension extends beyond the body, and the pressing plate 15 is configured to movably press against at least a portion of the extension of the first carrier 13.

In some embodiments of the present disclosure, the fixture 4 includes a plurality of pressing plates 15, each pressing plate 15 having a first end connected to a first connector 5.

For example, referring to FIGS. 3 and 4, the fixture 4 includes two pressing plates 15 (the pressing plates 15 are not limited to plate shape, other shapes may be possible, for example, pressing bars, pressing blocks, etc.) and a first connector 5. The first connector 5 is in a strip shape, the two pressing plates 15 are arranged in parallel, and the first ends (left ends in FIG. 3) of the two pressing plates 15 both extend beyond the second carrier 3, and the first connector 5 is respectively connected with the first ends of the two pressing plates 15 extending beyond the second carrier 3, so that the holding unit 1 in this embodiment is approximately π-shaped, and the operation of the fixture 4 can be conducted through operating the first connector 5 by the user.

In some embodiments of the present disclosure, the shape of the pressing plate may be rectangular, trapezoidal, triangular, arcuate, etc.

Figure 5:
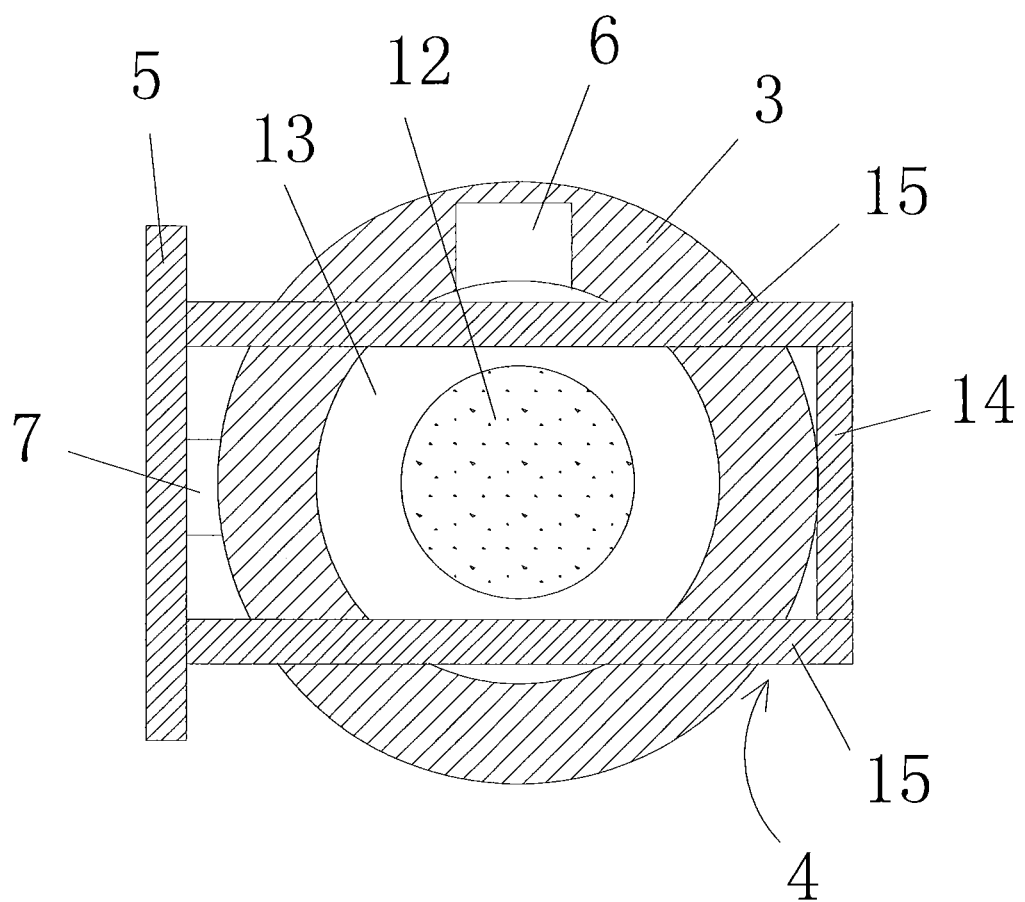
FIG. 5 is a schematic plan view of a holding unit in another embodiment of the disclosure.
Figure 6:
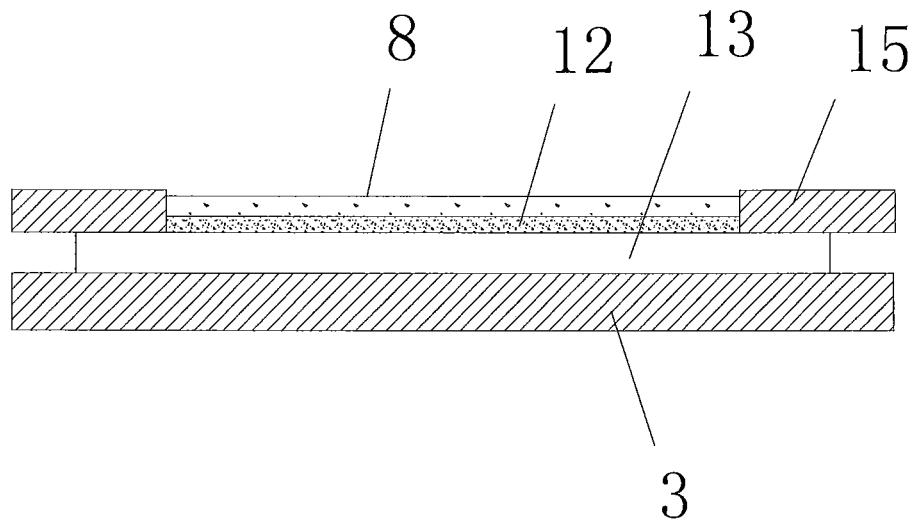
FIG. 6 is a side sectional view of a holding unit in another embodiment of the disclosure.

In some embodiments of the present disclosure, as shown in FIGS. 5 and 6, the second carrier 3 is in the shape of a circular plate (of course, other shapes and structures are also possible), and the holding unit 1 includes a fixture 4 composed of a first connector 5 and two pressing plates 15 arranged in parallel, and the first connector 5 is in a strip shape as the fixture 4. In addition, the holding unit 1 further includes a second connector 14, which is not unique in shape, for example, is still strip-shaped like the first connector 5, and the second end (right ends in FIG. 5) of each of the pressing plates 15 in the fixture 4 mentioned above is connected to the second connector 14. Specifically, both ends of the two fixtures 4 extend beyond the second carrier 3, and the first connector 5 and the second connector 14 are respectively arranged at two ends of the two pressing plates 15, so that the first connector 5, the second connector 14 and the two pressing plates 15 cooperate to form a rectangular enclosed region, and the biological sheet 12 is positioned in the orthographic projection area of the enclosed region (i.e., when the fixture 4 is pressed against the first carrier, the biological sheet 12 is positioned in the orthographic projection area of the enclosed region).

Referring to FIGS. 5 and 6, in some embodiments of the present disclosure, the first carrier 13 further includes a cover film 8 for covering the biological sheet 12 in the enclosed region to further protect and limit the biological sheet 12, the cover film 8 is made of a film material that is permeable to air and water, that is, the air and water permeable cover film 8 is configured to at least partially cover the biological sheet 12 in a state where the first carrier 13 carries the biological sheet 12. Wherein, the above-mentioned fixture 4 may also be increased in number according to the actual situation, like the fixture 4 shown in FIG. 3.

In some embodiments, the cover film 8 may be made of a polymer material having a microporous structure, for example, a material of the first carrier.

In some embodiments of the present disclosure, in order to make the fixture 4 and the second carrier 3 form an integral body, to be convenient for the user to stow and carry, convenient for the user to operate the fixture 4 and convenient for the engagement and disengagement of the fixture 4 and the second carrier 3, the holding unit 1 further includes a rotating mechanism 7, which is respectively connected with the second carrier 3 and the first connector 5, so that the fixture 4 (together with the first connector 5) can rotate relative to the second carrier 3 under the drive of the rotating mechanism 7, that is, the engagement of the fixture 4 with the second carrier 3 and disengagement of the fixture 4 from the second carrier 3 can be realized by the rotation of the rotating mechanism 7

For example, firstly, the rotating mechanism 7 is driven, so that the rotating mechanism 7 drives the first connector 5 to rotate together with the fixture 4 to disengage from the second carrier 3, so as to place the biological sheet 12 on the first carrier 13 and place the first carrier 13 on the second carrier 3. Then, the rotating mechanism 7 is driven in an opposite direction to drive the first connector 5 and the fixture 4 to rotate in the opposite direction to a position where the fixture 4 is engaged with the second carrier 3. That is, the fixture 4 is pressed over the first carrier 13, in which the pressing plate 15 is pressed over the first carrier 13, thus fixing the first carrier 13 and the biological sheet 12 together on the second carrier 3.

The structure of the above-mentioned rotating mechanism 7 is not unique, as long as the rotary connection between the fixture 4 and the second carrier 3 can be realized, for example, a hinge can be used as the rotating mechanism 7, or a rotating shaft and a shaft sleeve assembly can be used as the rotating mechanism 7.

Figure 7:
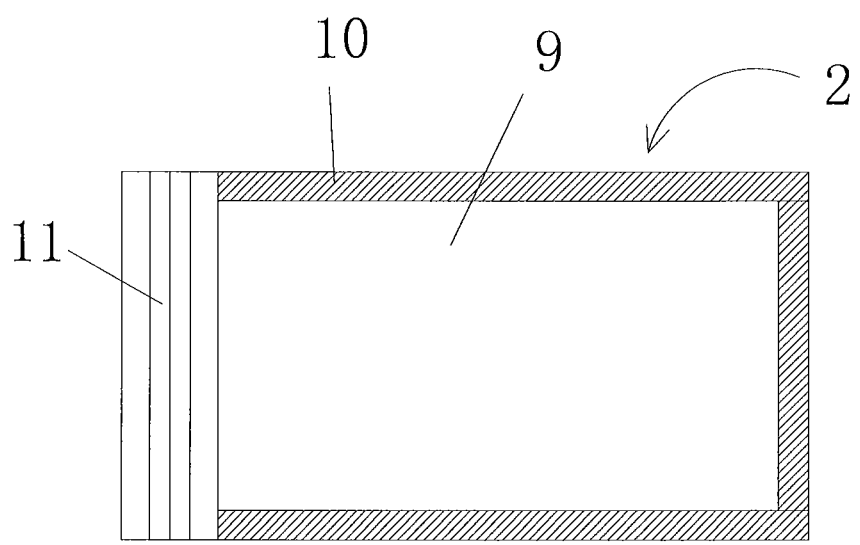
FIG. 7 is a partial sectional view of an enclosure in an embodiment of the disclosure.

In some embodiments of the present disclosure, as shown in conjunction with FIG. 7, the enclosure 2 includes a first diaphragm and a second diaphragm which are oppositely disposed, and the sides of the first diaphragm and second diaphragm are connected by a heat conductive material to enable the first diaphragm and the second diaphragm to cooperate to form a bag 9 with an end thereof open.

For example, the first diaphragm and the second diaphragm are both rectangular diaphragms (diaphragms of other shapes can also be adopted). Three pairs of corresponding side edges of the first diaphragm and the second diaphragm are sequentially connected through the heat conductive material to form three heat conductive edges 10, which are used for rapidly conducting away the heat of the biological sheet 12, so that the biological sheet 12 can be rapidly cooled and keep its biological activity.

For example, the heat conductive material can be a high heat conductive material such as metal (aluminum, copper, etc.), heat conductive rubber, heat conductive ceramic, heat conductive polymer, etc.

In some embodiments, as shown in FIG. 7, in order to achieve the effect of sealing the holding unit 1 carrying the biological sheet 12 in the bag 9, a sealing structure 11 may be provided at the open end of the bag 9, for example, plastic sealing edges connected by a concave-convex matching structure or a structural member for heat sealing may be used. The specific sealing method is not unique and may be determined according to the actual situation.

In some embodiments, the enclosure 2 may be a disposable enclosure in order to facilitate the user's use while ensuring the cleanness of the biological sheet 12.

In some embodiments of the present disclosure, protective liquid is injected into the enclosure 2, so that the holding unit 1 can be immersed in the protective liquid after being loaded into the enclosure 2 to achieve the effect of water isolation and improve the protection of the biological sheet 12.

In some embodiments of the present disclosure, the protective liquid includes dimethyl sulfoxide, which can meet the needs of low-temperature storage of the biological sheet 12 due to its high boiling point.

It should be noted that the present disclosure uses expressions "an embodiment", "one embodiment" or "some embodiments" along with their derivatives, and these expressions and terms mean that a specific feature, structure or characteristic described in connection with the embodiment is included in at least an embodiment. The appearances of the phrase "in an embodiment" in various places in this disclosure are not necessarily all referring to the same embodiment.

It should be understood that the words "a" or "an" in the claims of the present disclosure do not exclude plural numbers, and are only intended for convenience of description and should not be construed as limiting the scope of protection of the present disclosure.

Although the subject matter has been described in language specific to structural features and/or methodological acts, it should be understood that the subject matter defined in the appended claims is not necessarily limited to the specific features or acts described above. On the contrary, the specific features and acts described above are disclosed as exemplary forms of implementing the claims. Obviously, those skilled in the art can make various modifications and variations to the embodiments of the present disclosure without departing from the spirit and scope of the present disclosure. Thus, if these modifications and variations of the present disclosure fall within the scope of the claims of the present disclosure and their equivalents, the present disclosure is also intended to include these modifications and variations.

The invention claimed is:

1. A biological sheet storage device comprising:
   a holding unit comprising a first carrier, a second carrier and a fixture, wherein the first carrier is configured to carry a biological sheet, the first carrier is on the second carrier, and the fixture is configured to fix the first carrier onto the second carrier; and
   an enclosure configured to enclose the holding unit that is configured to carry the biological sheet,
   wherein the fixture comprises at least one pressing plate,
   wherein the first carrier comprises a body that is configured to carry the biological sheet and an extension extending from the body with the extension extending beyond the body, and
   wherein the at least one pressing plate is configured to movably press against at least a portion of the extension of the first carrier.

2. The biological sheet storage device according to claim 1,
   wherein the fixture comprises a plurality of pressing plates,
   wherein each of the plurality of pressing plates has a first end connected to a first connector.

3. The biological sheet storage device according to claim 2,
   wherein the fixture comprises two parallel rectangular pressing plates, and wherein a first end of each of the pressing plates extends beyond the second carrier and is connected to the first connector.

4. The biological sheet storage device according to claim 2, wherein a second end of each of the pressing plates is connected to a second connector.

5. The biological sheet storage device according to claim 4,
   wherein at least one of the plurality of pressing plates, the first connector and the second connector are connected to form an enclosed region, and
   wherein the biological sheet is in an orthographic projection area of the enclosed region in a state that the first carrier carries the biological sheet.

6. The biological sheet storage device according to claim 2, wherein the first carrier comprises a water and air permeable cover film configured to at least partially cover the biological sheet in a state that the first carrier carries the biological sheet.

7. The biological sheet storage device according to claim 2, wherein the first connector is connected to the second carrier by a rotating mechanism configured to engage the fixture with the second carrier or disengage the fixture from the second carrier.

8. The biological sheet storage device according to claim 1, wherein the first carrier comprises at least one projection connected to an extension extending from a body for that is configured to carry the biological sheet.

9. The biological sheet storage device according to claim 1, wherein the first carrier comprises a carrier film comprising a material having tissue compatibility with the biological sheet that is carried.

10. The biological sheet storage device according to claim 1, wherein the biological sheet comprises a cell sheet.

11. The biological sheet storage device according to claim 1,
    wherein the enclosure comprises a first diaphragm and a second diaphragm,
    wherein the first diaphragm and the second diaphragm are oppositely disposed with respect to each other, and
    wherein corresponding side edges of the first diaphragm and the second diaphragm are connected through a heat conductive material so that the first diaphragm and the second diaphragm form a bag with an end thereof open.

12. The biological sheet storage device according to claim 11, wherein an open end of the bag is provided with a sealing structure for sealing the bag.

13. The biological sheet storage device according to claim 12,
    wherein a protective liquid is in the enclosure, and
    wherein the holding unit is immersed in the protective liquid.

14. The biological sheet storage device according to claim 13, wherein the protective liquid at least comprises dimethyl sulfoxide.

* * * * *